United States Patent
Mao (10) Patent No.: US 8,339,290 B2
(45) Date of Patent: Dec. 25, 2012

(54) CONTROL METHOD OF ALTERABLE KEY AND PORTABLE ELECTRONIC DEVICE HAVING ALTERABLE KEY

(75) Inventor: Andrew Mao, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 1100 days.

(21) Appl. No.: 12/038,931

(22) Filed: Feb. 28, 2008

(65) Prior Publication Data

US 2008/0211699 A1  Sep. 4, 2008

(30) Foreign Application Priority Data

Mar. 2, 2007 (TW) ................ 96107145 A (51) Int. Cl.
*H03K 17/94* (2006.01)
*H03M 11/00* (2006.01)
*G06F 3/02* (2006.01)
*G09G 5/00* (2006.01)

(52) U.S. Cl. ............. 341/23; 341/28; 345/171; 345/172

(58) Field of Classification Search .......... 341/23, 341/28; 178/17 C; 345/168–173; 715/703; 400/486–487; 348/734
See application file for complete search history.

(56) References Cited

U.S. PATENT DOCUMENTS

| 6,803,903 | B1 * | 10/2004 | Ostergard et al. ............ 345/168 |
| 7,606,483 | B2 * | 10/2009 | Kurosawa ..................... 396/299 |
| 2006/0037848 | A1 * | 2/2006 | Kobayashi .................... 200/310 |
| 2008/0204418 | A1 * | 8/2008 | Cybart et al. ................. 345/173 |

FOREIGN PATENT DOCUMENTS

| TW | 545646 | 5/2002 |
| TW | 571326 Y | 12/2002 |

* cited by examiner

*Primary Examiner* — Albert Wong
*Assistant Examiner* — Jerold Murphy
(74) *Attorney, Agent, or Firm* — Muncy, Geissler, Olds & Lowe, PLLC (57) ABSTRACT

A control method of an alterable key is applied in a portable electronic device including switch a plurality of function modes. The portable electronic device has an opaque key portion, a pattern template layer, and a plurality of light emitting portions. A pattern template layer has many groups of operating patterns. Light emitting portions are corresponding to the operating patterns and emit the specific light, and the operating patterns are corresponding to the function modes. The control method includes the following steps of receiving a first command to switch the corresponding function mode, brightening the light emitting portion corresponding to the function mode to show the corresponding operating patterns on the opaque key portion, receiving a second command to switch another corresponding function mode, and brightening the light emitting portion corresponding to another function mode to show another corresponding operating patterns on the opaque key portion.

8 Claims, 6 Drawing Sheets

CONTROL METHOD OF ALTERABLE KEY AND PORTABLE ELECTRONIC DEVICE HAVING ALTERABLE KEY

CROSS REFERENCE TO RELATED APPLICATIONS

This Non-provisional application claims priority under 35 U.S.C. §119(a) on Patent Application No(s). 096107145 filed in Taiwan, Republic of China on Mar. 2, 2007, the entire contents of which are hereby incorporated by reference.

BACKGROUND OF THE INVENTION

1. Field of Invention

The invention relates to a control method and, more particularly, to a control method of an alterable key and a portable electronic device having the alterable key.

2. Related Art

A portable electronic device has advantages of lightness, slimness, shortness smallness, and also has functions of a specific man-machine interface (such as a touch control input interface), wireless communication (such as audio and data transmission, artificial intelligence (such as word or speech recognition) and so on. Then a user can work at any time and at any place, so that the portable electronic device is broadly used in daily life.

At present, a common portable electronic devices used in the mobile communication includes the personal digital assistant (PDA), the mobile phone and so on. Taking the mobile phone as an example, the present mobile phone not only has a function of making or answering a call, but also has a function of accessing the Internet, receiving e-mail or data, transmitting images, camera, editing memorandum, address list, dictionary, playing music etc.

Figure 1:
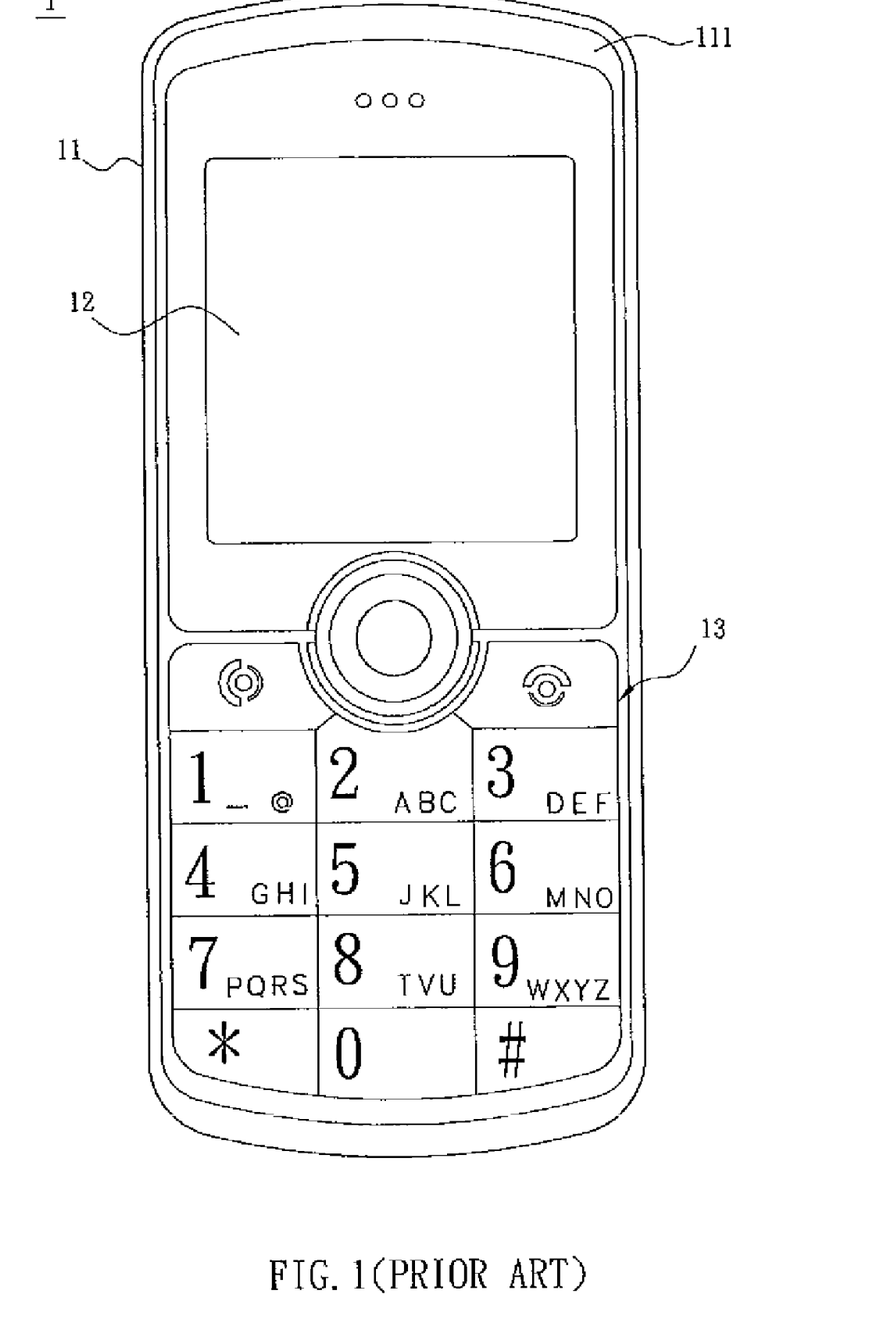
FIG. 1 is a schematic diagram showing a conventional portable electronic device.

Please refer to FIG. 1, and FIG. 1 is a schematic diagram showing a conventional mobile phone 1. The mobile phone 1 includes a body 11, a display panel 12 and a plurality of keys 13, and the display panel 12 and the keys 13 are disposed on a surface 111 of the body 11. As shown in FIG. 1, the surface of each of the keys 13 has a plurality of operating patterns (such as 1, 2, 3, A, B, C, etc), and each of the keys 13 stands for a different function when the mobile phone 1 is operated in different modes (such as making or answering a call, or sending a short message and so on).

As mentioned above, the number of the operating patterns on each of the keys 13 is correspondingly increased with the functions of the mobile phone 1. The sizes of the operating patterns on each of the keys 13 may be reduced, so that the user is difficult to read the content of the operating patterns. On the contrary, if the sizes of the operating patterns are not reduced, the number of the operating patterns which are arranged on each of the keys 13 is limited and thereby not all operating patterns of all operating modes is capable of showing on the keys 13.

A portable electronic device which has greater functions will be more convenient for the user However, the development tendency of the portable electronic device is to be light, slim, short and small. If functions of the portable electronic device are increased, the portable electronic device may be limited in quantity. It is inconvenient in usage for the user, and then the desire of the user to buy the product is decreased.

How to provide a control method of an alterable key having various function modes and a portable electronic device having the alterable key to solve the problem that the present portable electronic device faces has been a great subject at present.

SUMMARY OF THE INVENTION

The objective of the invention is to provide a control method of an alterable key with a plurality of function modes and a portable electronic device with an alterable key.

To achieve the above objective, a control method of an alterable key of the invention can be applied to a portable electronic device including a plurality of function modes. The portable electronic device has an opaque key portion, a pattern template layer, and a plurality of light emitting portions. The opaque key portion only allows specific light to pass through. The pattern template layer is located under the opaque key portion and has a plurality of groups of operating patterns. Light emitting portions correspond to the operating patterns and emit the specific light. The operating patterns are corresponding to the function modes. The control method comprises the following steps of receiving a first command to switch a corresponding function mode, brightening a light emitting portion corresponding to the function mode to show a group of operating patterns corresponding to the function mode on the opaque key portion, receiving a second command to switch another corresponding function mode, and brightening a light emitting portion corresponding to another function mode to show a group of operating patterns corresponding to another function mode on the opaque key portion.

To achieve the above objective of the invention, a portable electronic device may switch a plurality of function modes is disclosed. The portable electronic device includes an opaque key portion, a pattern template layer disposed under the opaque key portion and a plurality of light emitting portions disposed under the pattern template layer. The opaque key portion only allows specific light to pass through, and the pattern template layer has a plurality of groups of operating patterns which are corresponding to the function modes. The light emitting portions are corresponding to each group of operating patterns, respectively, and the light emitting portion corresponding to the operating patterns is brightened to emit the specific light to show the operating patterns corresponding to the function mode on the opaque key portion.

As mentioned above, an opaque key portion, a pattern template layer and a plurality of light emitting portions disposed under the pattern template layer are utilized in the control method of an alterable key and a portable electronic device with an alterable key of the invention to achieve the objective of switching a plurality of function modes.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The following illustrates a control method of an alterable key and a portable electronic device with an alterable key according to a preferred embodiment of the invention with related drawings. The present invention will be apparent from the following detailed description, which proceeds with reference to the accompanying drawings, wherein the same references relate to the same elements.

Figure 2A:
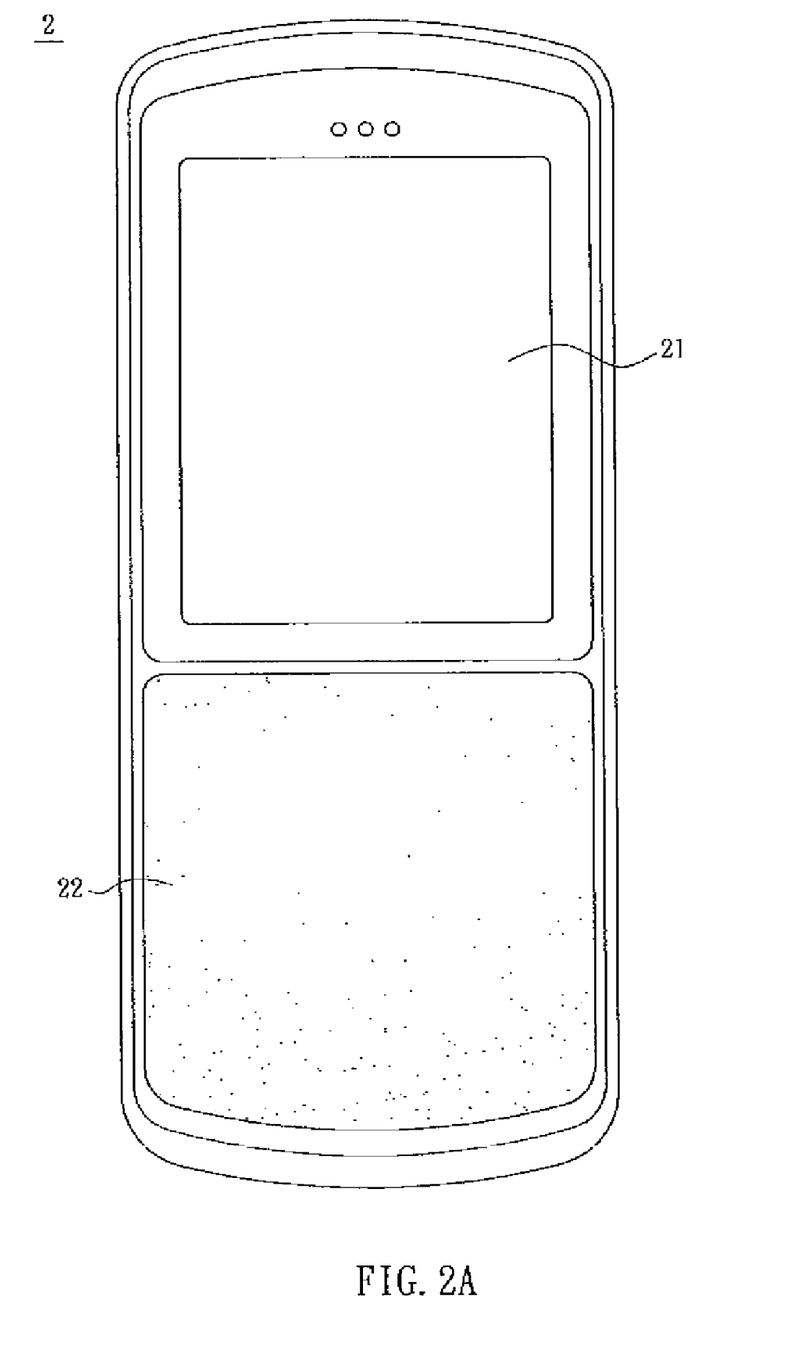
FIG. 2A is a schematic diagram showing a portable electronic device according to a preferred embodiment of the invention.
Figure 2B:
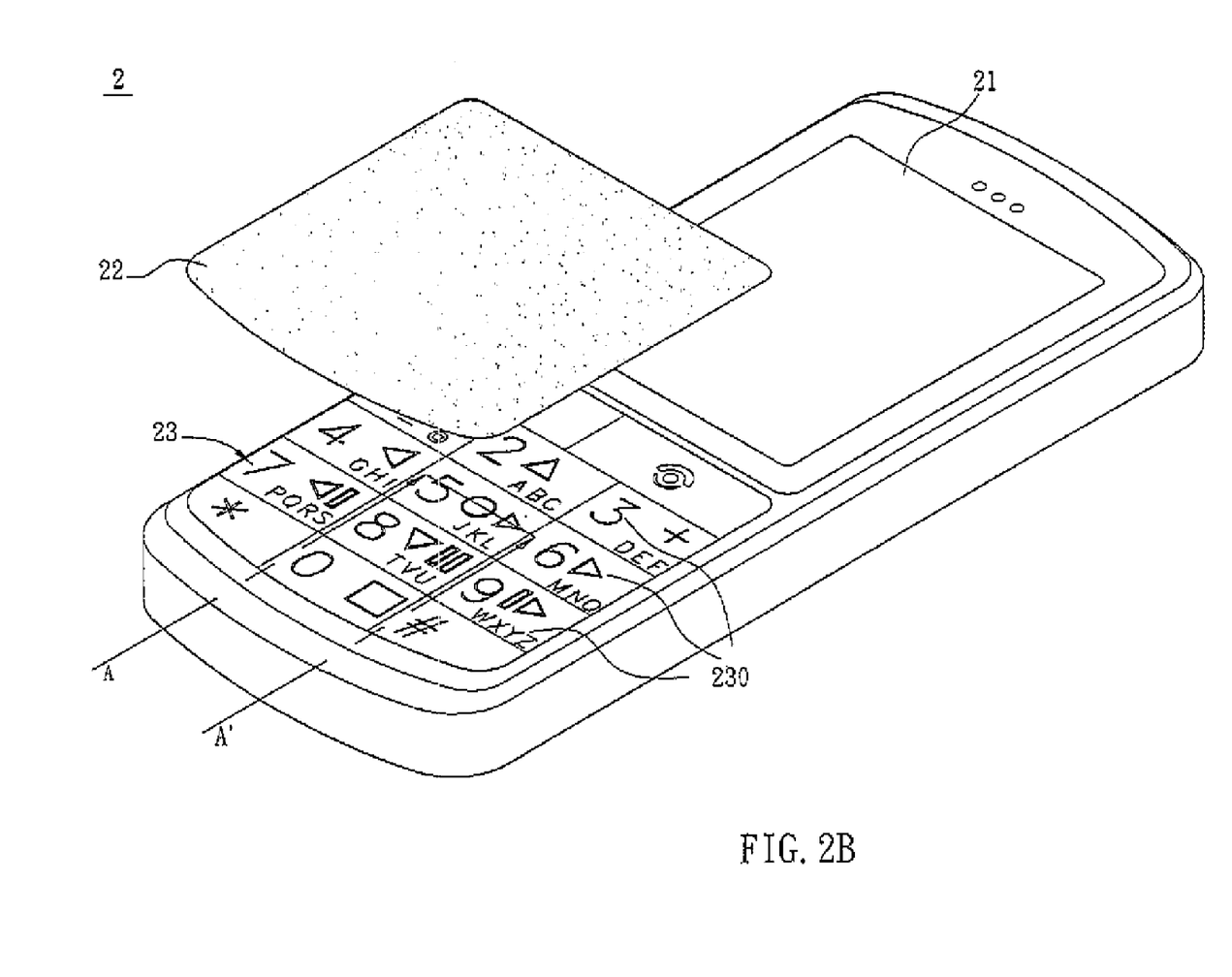
FIG. 2B is an oblique diagram showing the portable electronic device in FIG. 2A.
Figure 2C:
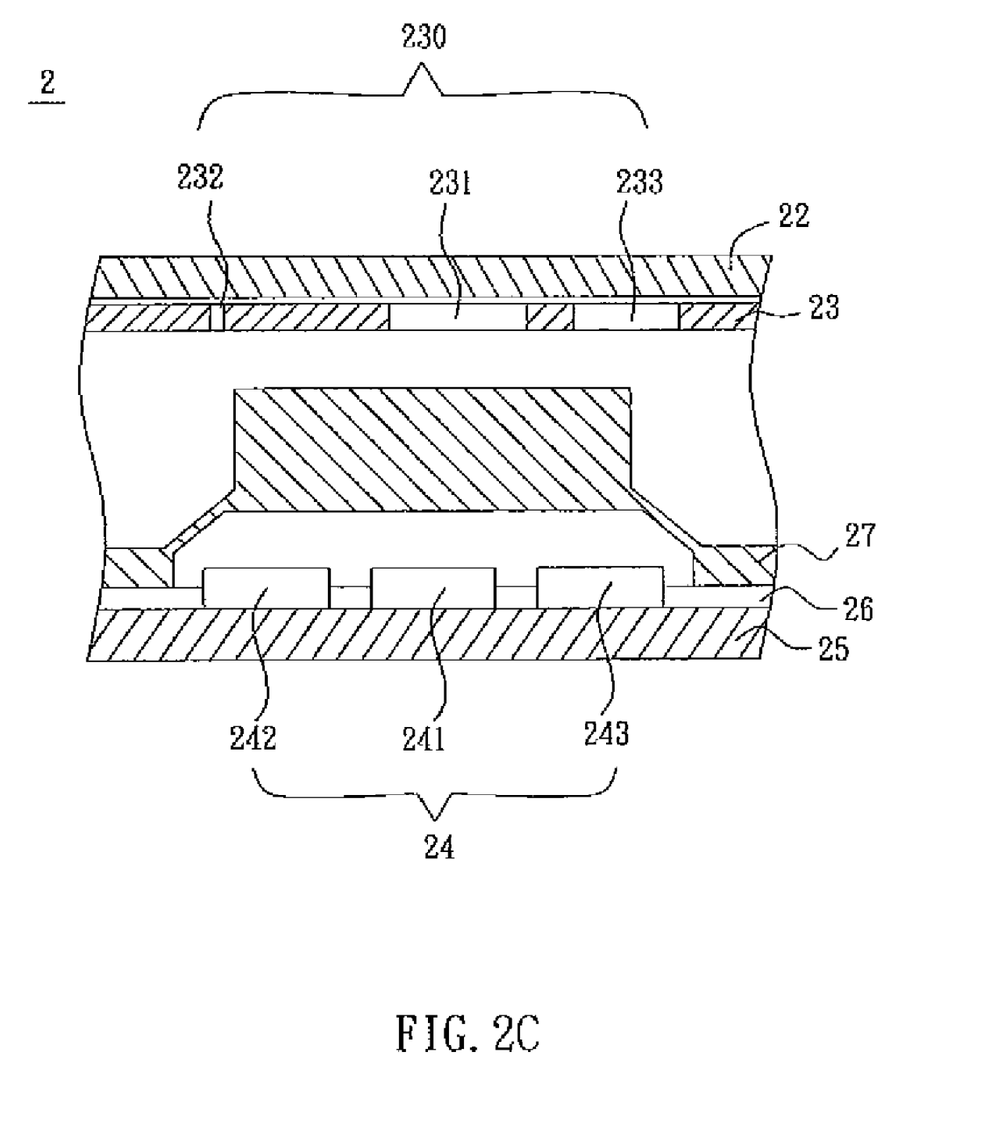
FIG. 2C is a sectional diagram showing the portable electronic device along a line A-A' in FIG. 2B.

Please refer to FIG. 2A to FIG. 2C. FIG. 2A is a schematic diagram showing a portable electronic device 2 according to a preferred embodiment of the invention. FIG. 2B is an oblique diagram showing the portable electronic device 2 in FIG. 2A. FIG. 2C is a sectional diagram showing the portable electronic device 2 along a line A-A' in FIG. 2B. In the embodiment, the portable electronic device 2 can be, for example, a bar type of mobile phone, but it is not limited.

Please refer to FIG. 2A to FIG. 2C. In the embodiment, a portable electronic device 2 has a display panel 21, an opaque key portion 22, a pattern template layer 23, a plurality of light emitting portions 24, a circuit board 25, a key matrix layer 26 and a light-permeable pressing layer 27.

In the embodiment, the portable electronic device 2 may switch a plurality of function modes (such as a communication function mode, a short message transmission or receiving function mode, an audio-video recording or playing function mode, an assistant function mode etc.).

The display panel 21 is electrically connected to the circuit board 25, and the display panel 21 may be a liquid crystal display (LCD) panel or an organic light emitting diode (OLDE) panel to show the function menu (such as a standby mode menu, an active mode menu, a multimedia mode menu, and so on) of the portable electronic device 2.

Please refer to FIG. 2C. The pattern template layer 23 is disposed under the opaque key portion 22, and the light emitting portions 24 are disposed under the pattern template layer 23. The opaque key portion 22 only allows specific light to pass through, and the pattern template layer 23 has a plurality of groups of operating patterns 230 which are corresponding to the function modes. Taking FIG. 2B as an example, the corresponding operating patterns 230 are English letter patterns (such as A, B, C, D, etc.), numerical patterns (such as 1, 2, 3, 4, etc.), music control patterns (such as broadcast, pause, fast forward, playback, stop, etc.). In FIG. 2C, the operating patterns 230 correspond to a first opening 231, a second opening 232 and a third opening 233. The number of the openings may be adjusted according to an actual requirement.

In addition, the light emitting portions 24 can include a first light emitting portion 241, a second light emitting portion 242 and a third light emitting portion 243 (as shown in FIG. 2C). The positions where the light emitting portions 24 are disposed are corresponding to the positions where the operating patterns 230 are disposed. The position where the first opening 231 is disposed is corresponding to the position where the first light emitting portion 241 is disposed. The position where the second opening 232 is disposed is corresponding to the position where the second light emitting portion 242 is disposed. The position where the third opening 233 is disposed is corresponding to the position where the third light emitting portion 243 is disposed. Herein, the number of the light sources can be adjusted according to an actual requirement. Furthermore, the first light emitting portion 241, the second light emitting portion 242 and the third light emitting portion 243 can be light emitting diodes or other radiant bodies.

In addition, please refer to FIG. 2C, and the key matrix layer 26 is electrically connected to the circuit board 25. When the opaque key portion 22 is pressed and contacts with the key matrix layer 26, the key matrix layer 26 outputs a signal to the circuit board 25. The key matrix layer 26 determine the position where is pressed according to a coordinate system to generate a corresponding signal and output the signal to the circuit board 25. For example, the key matrix layer 26 may be a matrix flexible circuit board on which an electric current is switched on. When a user presses the specific position of the opaque key portion 22, the light-permeable pressing layer 27 corresponding to the specific position contacts with the key matrix layer 26 corresponding to the specific position. The coordinate position corresponding to the specific position short-circuits, and then the circuit board 25 determine the position where the user presses the opaque key portion 22 because of not receiving a return electric current value from the coordinate position. The method of determining the coordinate position is not limited, and when a user presses the specific position of the opaque key portion 22, the light-permeable pressing layer 27 can also contact with the key matrix layer 26 to make the circuit of the coordinate position corresponding to the specific position conduct, and then the circuit board 25 can determine the position where the user presses the opaque key portion 22 after the circuit board 25 receives the electric current value of the coordinate position.

As shown in FIG. 2C, the light-permeable pressing layer 27 of the embodiment is disposed between the key matrix layer 26 and the pattern template layer 23. The light-permeable pressing layer 27 may be a hollow body or a dome (a metal dome, rubber dome or plastic dome). When the user presses the opaque key portion 22, the light-permeable pressing layer 27 contacts with the key matrix layer 26 to make the key matrix layer 26 generate a signal which is transmitted to the circuit board 25. The circuit board 25 generates a command according to the signal to control actions of the portable electronic device 2.

In the embodiment, the light emitting portion 24 may be brightened correspondingly according to the function mode which the portable electronic device 2 switches to show the corresponding operating patterns 230 can on the opaque key portion 22.

On the contrary, when the light emitting portions 24 do not illuminate, the user cannot see any pattern on the opaque key portion 22. The opaque key portion 22 may be a component which is opaque but has a light-permeable quality, such as a semitransparent plate, a semitransparent film and so on.

Figure 3:
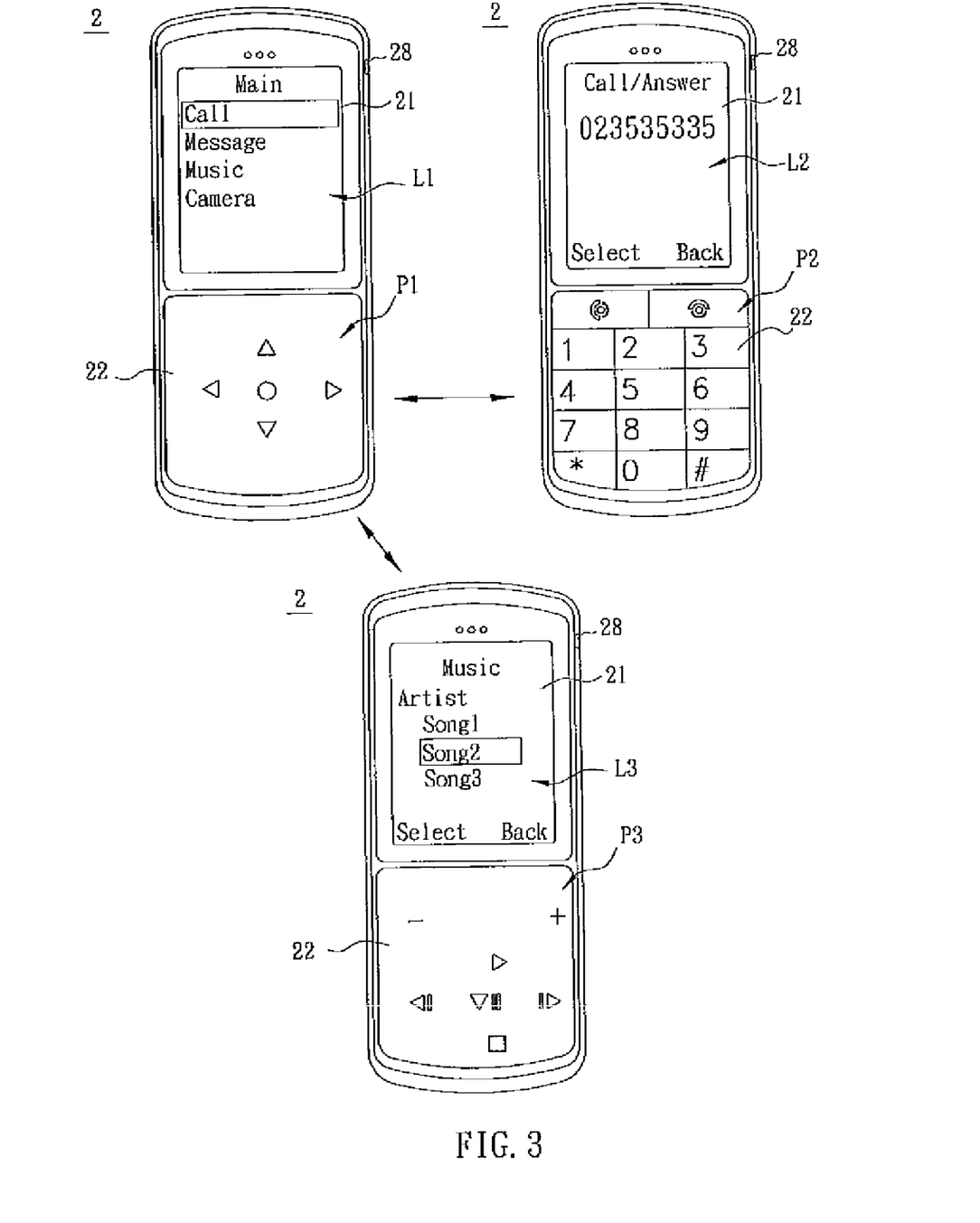
FIG. 3 is a schematic diagram showing the usage operation process of the portable electronic device according to a preferred embodiment of the invention.

Please refer to FIG. 2C and FIG. 3. The following illustrates the usage operation process of the portable electronic device 2 of a preferred embodiment of the invention.

When the user presses a switch 28 which is disposed on the portable electronic device 2, the portable electronic device 2 receives a first command to switch a first function mode (a main picture function). The display panel 21 will shows a first function menu L1 (a main picture menu) which is corresponding to the first function mode, and the first light emitting portion 241 of the light emitting portions 24 emit specific light which passes through the first opening 231 of the pattern template layer 23. The opaque key portion 22 in sequence to make the opaque key portion 22 show a first operating pattern P1 (such as patterns of up, down, left, right or entering function keys).

Next, when the user presses the opaque key portion 22 according to the first operating pattern P1 to select a making or answering call function. The portable electronic device 2 receives a second command to switch a second function mode (a making or answering call function). The display panel 21 show a second function menu L2 (a making or answering call menu), the first light emitting portion 241 goes out and the second light emitting portion 242 emits specific light which pass through the second opening 232 of the pattern template layer 23. The opaque key portion 22 in sequence to make the opaque key portion 22 show a second operating pattern P2 (numeric keys and making or answering call keys). Then, the user presses the opaque key portion 22 according to the second operating pattern P2 (numeric keys and making or answering call keys) to make a call.

In addition, when the user finishes telephoning and wants to make the portable electronic device 2 return to the first function mode of the main picture function, the second light emitting portion 242 goes out, and the display panel 21 returns to the first function menu L1 (the main picture menu). Then, the first light emitting portion 241 emits the specific light again to make the opaque key portion 22 show the first operating pattern P1 (the function keys) again.

Similarly, if the user selects a music playing function at this time, similar to the above steps, the portable electronic device 2 receives a third command to switch a third function mode (a music playing function). At this time, the display panel 21 shows a third function menu L3 (a music playing menu), the first light emitting portion 241 goes out and the third light emitting portion 243 emits specific light which pass through the third opening 233 of the pattern template layer 23 and the opaque key portion 22 in sequence to make the opaque key portion 22 show a third operating pattern P3 (music playing keys). And then the user can press the opaque key portion 22 according to the third operating pattern P3 (music playing keys) to perform functions of playing, pause, fast forwarding, playback, stop and so on. The above steps are for illustrating and the embodiment is not limited by this.

Furthermore, in the embodiment, when the light emitting portions 24 do not emit light, the user cannot see the pattern template layer 23, the light-permeable pressing layer 27 and the key matrix layer 26 which are hidden under the opaque key portion 22, and this design can also increase the variability of the portable electronic device 2.

In addition, the above function may be a making or answering call function, a short message transmission or receiving function, an audio-video recording or playing function, a camera function, a image transmission function, a memorandum editing function, a address list, a dictionary consulting function, a music playing function, an assistant function and any other functions which can be performed by the portable electronic device.

In addition, the portable electronic device is not limited, and a sliding cover mobile phone, a rotary cover or a flip-type mobile phone, an audio-video playing device, MP3 broadcaster, a MP4 broadcaster or any other portable electronic device having a multi-function key interface are within the scope of the invention.

Please refer to FIG. 4 again, and FIG. 4 is a flow diagram showing the control method of an alterable key according to a preferred embodiment of the invention. As mentioned above the control method of an alterable key according to the preferred embodiment is applied in a portable electronic device which can switch a plurality of function modes. The portable electronic device has an opaque key portion which only allows specific light to pass, a pattern template which is disposed under the opaque key portion and has a plurality of groups of operating patterns. A plurality of corresponding light emitting portions and the operating patterns are corresponding to the function modes.

Figure 4:
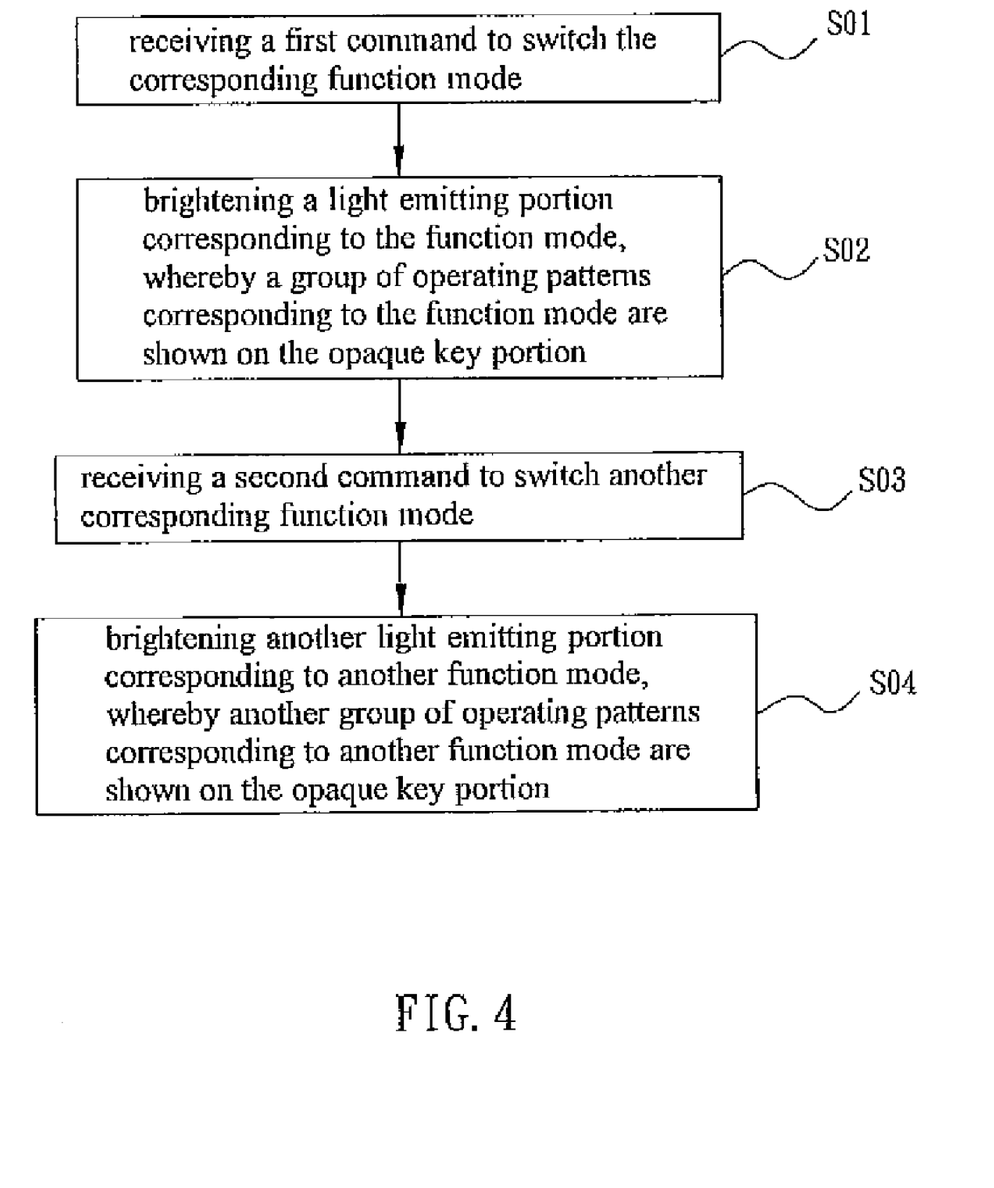
FIG. 4 is a flow diagram showing the control method of an alterable key according to a preferred embodiment of the invention.

The control method of an alterable key according to the embodiment includes the following steps of receiving a first command to switch a corresponding function mode (step S01), brightening a light emitting portion corresponding to the function mode, to show a group of operating patterns corresponding the function mode on the opaque key portion (step S02), receiving a second command to switch another corresponding function mode (step S03), and brightening the light emitting portion corresponding to another function mode to show a group of operating patterns corresponding to another function mode on the opaque key portion (step S04). Steps of the control method and actions corresponding to the portable electronic device have been described in the above embodiment, and they are not described for concise purpose.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A portable electronic device including a plurality of function modes, the portable device comprising:
   an opaque key portion only allowing specific light to pass through;
   a pattern template layer provided under the opaque key portion, wherein a plurality of openings are formed on the pattern template layer, and the openings form a plurality of groups of operating patterns corresponding to the function modes;
   a plurality of light emitting portions provided under the pattern template layer and corresponding to each group of the operating patterns, respectively, wherein when the light emitting portion corresponding to the group of the operating patterns is brightened, the opaque key portion shows the group of operating patterns corresponding to the function mode;
   a key matrix layer;
   a circuit board, wherein the key matrix layer and the light emitting portions are disposed on a surface of the circuit board, and
   a light-permeable pressing layer, wherein the light emitting portions are covered by the light-permeable pressing layer, and a space is formed between the light-permeable pressing layer and the light emitting portions.

2. The portable electronic device according to claim 1, wherein the key matrix layer is provided under the pattern template layer.

3. The portable electronic device according to claim 1, wherein the circuit board is electrically connected to the key matrix layer.

4. The portable electronic device according to claim 3, wherein the opaque key portion is pressed, and the key matrix layer is capable of outputting a signal to the circuit board.

5. The portable electronic device according to claim 4, wherein the key matrix layer determines the position where is pressed according to a coordinate system to generate the corresponding signal.

6. The portable electronic device according to claim 3 further comprises a display panel which is electrically connected to the circuit board.

7. The portable electronic device according to claim 2, wherein the light-permeable pressing layer is provided between the pattern template layer and the key matrix layer and is a hollow body or a dome.

8. The portable electronic device according to claim 1, wherein the light emitting portion is a light emitting diode (LED).

* * * * *